US012059700B2

(12) United States Patent
Zenou et al.

(10) Patent No.: US 12,059,700 B2
(45) Date of Patent: Aug. 13, 2024

(54) METHOD FOR OPERATING A WIRE-LESS VARIABLE GAP COATER DEVICE

(71) Applicant: IO Tech Group Ltd., London (GB)

(72) Inventors: Michael Zenou, Hashmonaim (IL); Ziv Gilan, Kfar-harif (IL)

(73) Assignee: IO Tech Group Ltd., Modiin (IL)

( * ) Notice: Subject to any disclaimer, the term of this patent is extended or adjusted under 35 U.S.C. 154(b) by 204 days.

(21) Appl. No.: 17/933,299

(22) Filed: Sep. 19, 2022

(65) Prior Publication Data

US 2023/0012396 A1 Jan. 12, 2023

Related U.S. Application Data

(62) Division of application No. 17/248,301, filed on Jan. 19, 2021, now Pat. No. 11,478,814.

(Continued)

(51) Int. Cl.
*B05C 11/02* (2006.01)

(52) U.S. Cl.
CPC .................................. *B05C 11/028* (2013.01)

(58) Field of Classification Search
CPC ....... B05C 1/08; B05C 1/0804; B05C 1/0808; B05C 1/0817; B05C 1/0821;

(Continued)

(56) References Cited

U.S. PATENT DOCUMENTS 3,595,206 A * 7/1971 Larimer .................. B05C 1/083 118/249
4,869,200 A 9/1989 Euverard (Continued)

FOREIGN PATENT DOCUMENTS

DE 103 18 028 A1 11/2004
DE 10 2008 054948 A1 7/2010

(Continued)

OTHER PUBLICATIONS

International Search Report and Written Opinion mailed Apr. 26, 2021, from the ISA/European Patent Office, for International Patent Application No. PCT/IB2021/050389 (filed Jan. 19, 2021), 10 pgs.

(Continued)

*Primary Examiner* — Dah-Wei D. Yuan
*Assistant Examiner* — Nga Leung V Law
(74) *Attorney, Agent, or Firm* — Ascenda Law Group, PC

(57) ABSTRACT

Systems and methods for coating a thin film with a viscous material, such as a liquid, a paste, or an adhesive, at a desired thickness. In such a system, two films move adjacent to one another, optionally in opposite directions, atop two rollers separated by a known gap that defines a coating thickness, with the material being transferred from one film to the other. The rollers may be maintained in their relative positions by springs and/or linear actuators and positioned using linear encoders. In alternative arrangements, the material to be coated could be low viscosity material such as a polymeric solution. Air knives may be provided near the gap to create an air flow that aids in preventing the free flow of low viscosity materials outside the bounds of the film during coating.

6 Claims, 14 Drawing Sheets

Related U.S. Application Data

(60) Provisional application No. 62/704,213, filed on Apr. 28, 2020.

(58) Field of Classification Search
CPC ..... B05C 1/0826; B05C 1/083; B05C 1/0834; B05C 1/0856; B05C 1/0865; B05C 1/0869; B05C 1/0873; B05C 1/0882; B05C 1/0895; B05C 11/028; B05C 11/06; B05C 1/14
See application file for complete search history.

(56) References Cited

U.S. PATENT DOCUMENTS

| | | | | |
|---|---|---|---|---|
| 4,928,622 | A | 5/1990 | Larsson et al. | |
| 6,174,394 | B1 | 1/2001 | Gvon et al. | |
| 7,018,475 | B2 * | 3/2006 | Ueberschar ............ | D21G 1/004 118/712 |
| 8,028,647 | B2 | 10/2011 | McMurtry et al. | |
| 10,099,422 | B2 | 10/2018 | Zenou et al. | |
| 10,144,034 | B2 | 12/2018 | Zenou | |
| 10,603,684 | B2 | 3/2020 | Zenou et al. | |

FOREIGN PATENT DOCUMENTS

| | | | | |
|---|---|---|---|---|
| DE | 102008054948 | A1 * | 7/2010 | ............ D21H 23/56 |
| WO | 99/67468 | A1 | 12/1999 | |

OTHER PUBLICATIONS

International Preliminary Report on Patentability mailed Mar. 29, 2022, from the IPEA/European Patent Office, for International Patent Application No. PCT/IB2021/050389 (filed Jan. 19, 2021), 11 pgs.

English Translation DE102008054948A1, published Jul. 1, 2010, 7 pgs.

Notice of Allowance mailed Sep. 14, 2022, for U.S. Appl. No. 17/248,301 (filed Jan. 19, 2021), 8 pgs.

Amendment filed Jul. 5, 2022, for U.S. Appl. No. 17/248,301 (filed Jan. 19, 2021), 12 pgs.

Non-Final Office Action dated May 9, 2022, for U.S. Appl. No. 17/248,301 (filed Jan. 19, 2021), 9 pgs.

Communication under Rule 71(3) EPC dated Mar. 17, 2023, from the European Patent Office, for EP Patent Application No. 21704315.7, 39 pgs.

* cited by examiner

METHOD FOR OPERATING A WIRE-LESS VARIABLE GAP COATER DEVICE

RELATED APPLICATIONS

This application is Divisional of U.S. application Ser. No. 17/248,301, filed 19 Jan. 2021 (now issued as U.S. Pat. No. 11,478,814), which is a nonprovisional of and claims priority to U.S. Provisional Application No. 62/704,213, filed 28 Apr. 2020, both of which are incorporated by reference herein.

FIELD OF THE INVENTION

The present invention relates to the formation of thin-film coatings using flowable substances and, more specifically, to facilities for obtaining thin films or coatings with a controlled variable gap.

BACKGROUND

Various types of wet film applicators are known from the prior art. For the correct determination of some special properties of coatings it is necessary to ensure that the coatings applied would have a predetermined thickness. In addition, it is desired that the applicator device would be adjustable to obtain the films of the desired thickness from various substances having varied physical properties.

One wet film applicator known from the prior art comprises a pair of wedge-shaped elements, which are parallel to each other and bear a transverse plane blade that forms the coating. A gap between the bottom edge of the blade and a base plane (substrate) determines the thickness of the applied coating. The thickness of this gap is varied when the blade is moved along the wedge-shaped elements. Once the required gap thickness is set, the mutual arrangement of parts in the device is fixed. The blade is oriented perpendicularly to the direction of application and forms a film of desired thickness when the applicator is moved relative to the substrate surface. This device is quite universal and provides a level of accuracy that is sufficient for the formation of conventional paint, lacquer, and other wet film coatings. The problem with this technique is that during the clamping of the mechanism, the tightening screws directly press against the blade, which imparts a twisting motion to the blade, and that, in turn, reduces the accuracy and quality of the thin film.

There are various known methods for the formation of high-quality films and, accordingly, various devices which implement these methods. For example, wet solutions can be applied using a drawing plate or a wiper (squeegee), which can be of a blade (sheet) or cylinder type. However, these devices do not ensure the formation of highly anisotropic films with reproducible characteristics, and this method of film formation requires prolonged preliminary work for determining the optimum application conditions for every batch of initial raw materials.

Attempts at solving such problems led to the creation of rather complicated devices, and applicators known in the prior art also include devices of the slot-die coating system type.

Patents depicting various devices of the prior art include U.S. Pat. Nos. 4,869,200, 6,174,394, and 8,028,647.

Despite the existing solutions, problems are still encountered that are related to the need for combining the necessary properties in one device, including high accuracy, simple adjustment, control over the film parameters (in particular, thickness), and the possibility of improving the quality of applied coatings by compensating for substrate unevenness.

SUMMARY OF THE INVENTION

Embodiments of the present invention are directed to the formation of a layer of material in a gap between two films. The presence of two films that can be moved relative to one another enables the creation of a uniform layer of material in-between the films while maintaining the possibility of easy cleaning just by rolling each one of the films when they are disengaged, thereby creating a completely new gap between them. Devices according to embodiments of the present invention are able to produce coatings at a high rate of application, with low consumption of raw materials and high-precision control over film thicknesses at very low cost.

Systems configured in accordance with embodiments of the present invention find particular application in situations where film quality is of great importance. An important example of this kind of application is the family of laser enhanced jetting applications (for example, see U.S. Pat. Nos. 10,144,034 and 10,099,422). In such applications, a highly uniform layer of material is needed in order to create a stable and reproducible jetting. To that end, a new approach of using two films was introduced by Zenou et al. in U.S. Pat. No. 10,603,684 using a pair of films with a wire between them to control the gap width and thereby the material layer thickness. The present invention introduces yet another approach where the gap is maintained without the wire being present.

Thus, embodiments of the present invention provide for coating of a thin film with a desired material at a desired thickness. The material can be a viscous material in the form of a liquid or a paste, or a low viscosity material. It may be an adhesive or a metal or ceramic paste or any polymeric solution.

In some embodiments the coating occurs in a gap between two rollers, but it is also possible to create a coating with a flat (planar) substrate at one side of the gap. In either instance, the roller(s) used to create/maintain the gap may be metallic, ceramic, or rubber rollers, such as polyurethane rubber rollers or others that will create a soft contact. The rollers may be free rollers or fixed ones. The width of the gap between the rollers, or between a roller and a planar substrate, determines the thickness of the material layer directly or via some correlation. It is also possible to control the gap using a pressure control using the same mechanical structure.

In one embodiment, the film to be coated passes over one roller and a second film passes over a second roller opposite the first. This second film can be advanced along with the first to remove any residue from previous coating operations, or to recover unused material, or for other purposes. Using such a second film enables coating of multiple materials one after the other without any contamination, creating a very powerful tool for printing different materials in consecutive order. Air knives may be provided near the gap to create an air flow that aids in preventing the free flow of low viscosity materials outside the bounds of the film during coating.

As the first film is advanced through the gap between its roller and the second film-covered roller, the material forms a layer on the film with a thickness equal to the distance between the two films across the gap. The roller opposite that of the film to be/being coated may be maintained in position by one, two, or more springs or other biasing elements. Two linear actuators in parallel with the springs can be used to move the second roller away from the first via two arms, thus widening the gap. A second pair (or other number) of springs arranged in parallel force the arms away from the second roller to avoid backlash when the linear actuators begin to pull the second roller away from the first.

A linear encoder may be mounted on each side of the system to measure the position of each arm. When the linear actuators move the second roller, the zero position of the system may be set as the position at which motion is first detected by the linear encoders. If the zero position corresponds to the rollers touching one another (or nearly so) the width of the gap is then determined by the amount of motion the linear encoders measure after this point. The start movement point may also be determined by force using pressure actuators. Further, the system may be equipped with optical, mechanical, or electrical, limit switches, which serve to identify when the arms have reached their home positions (which may correspond to a zero gap width, a fully open gap width, or some other gap width in-between these two).

These and further embodiments of the present invention are described below.

BRIEF DESCRIPTION OF THE DRAWINGS

The present invention illustrated by way of example, and not limitation, in the figures of the accompanying drawings, in which.

DESCRIPTION OF THE INVENTION

Figure 1A:
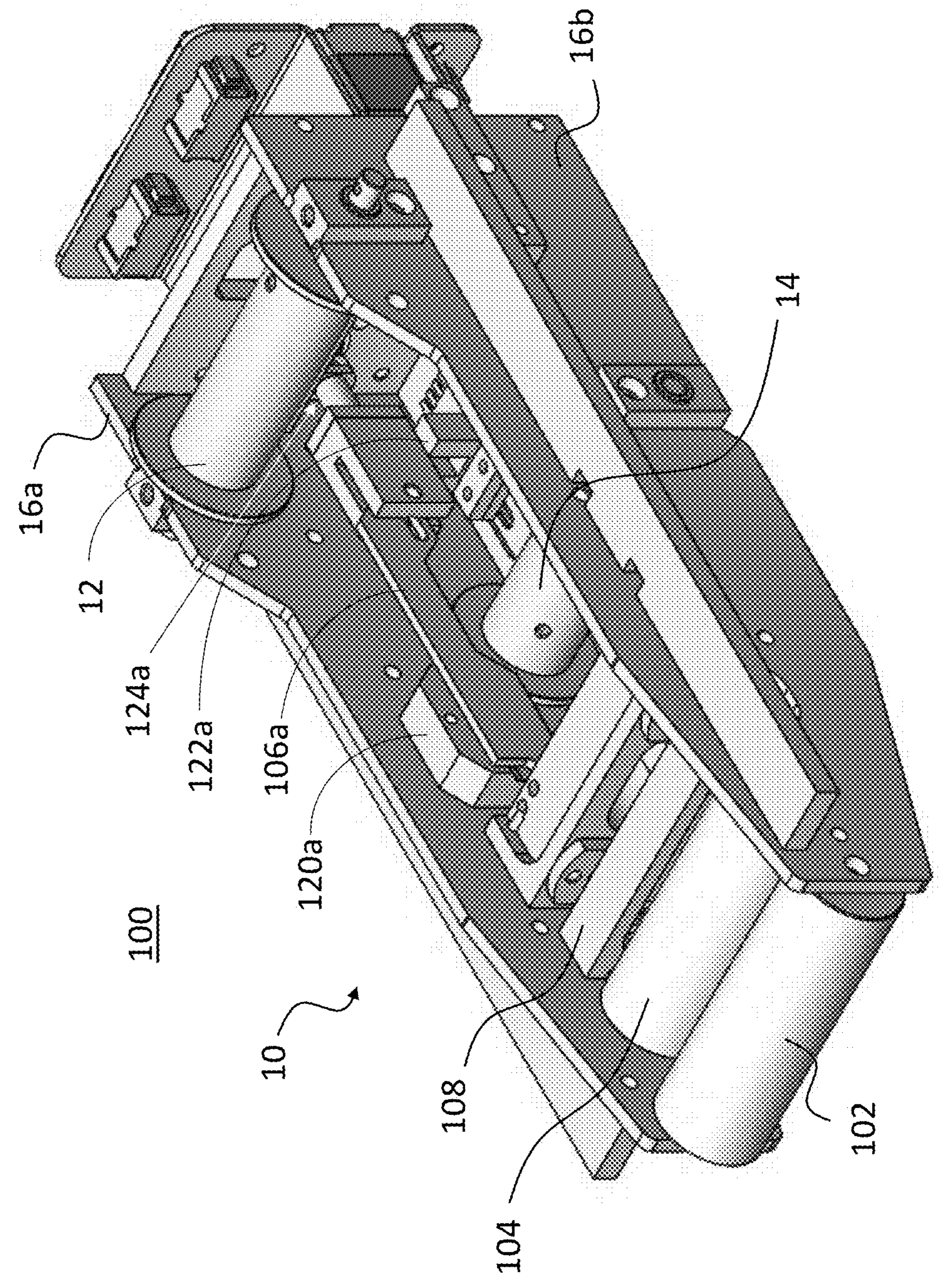
FIGS. 1A-1C illustrate one embodiment of a wire-less variable gap width system configured in accordance with the present invention in perspective view (FIG. 1A), front view (FIG. 1B), and back view (FIG. 1C).
Figure 1C:
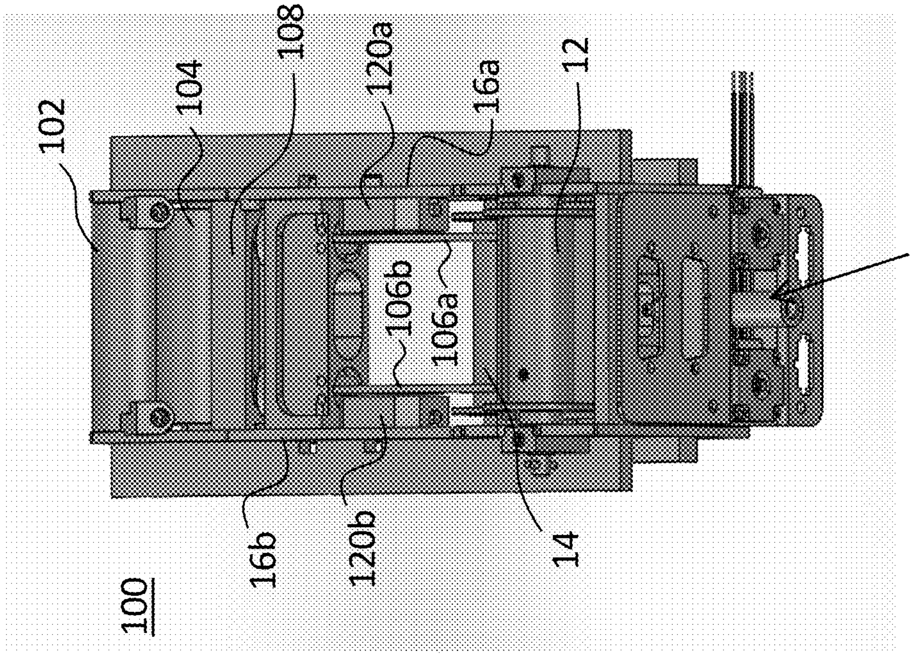
Figure 1B:
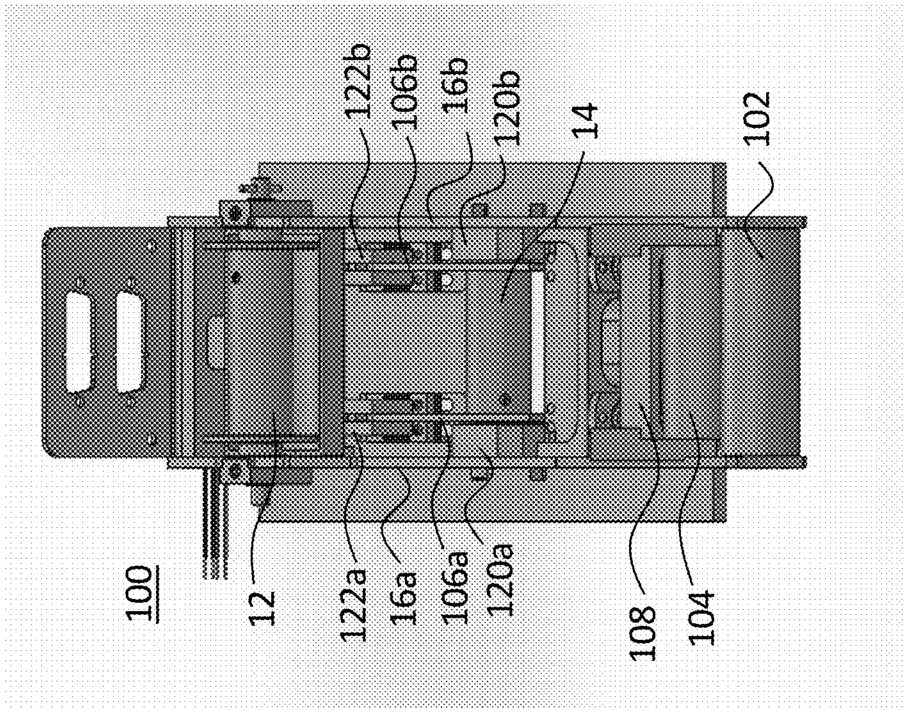
Figure 2:
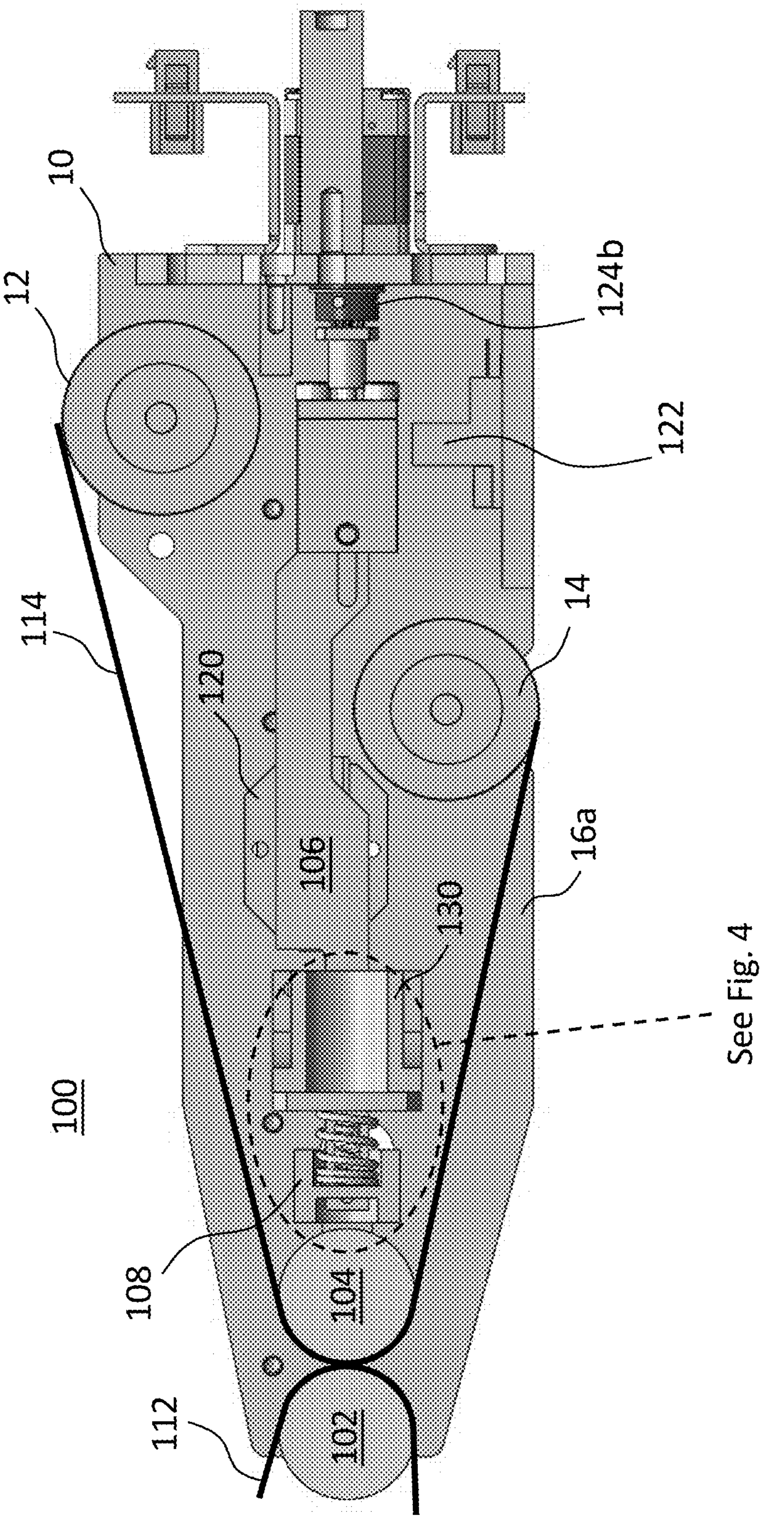
FIG. 2 illustrates a cross-section view of the system shown in FIG. 1.

Before describing the invention in detail, it is helpful to present an overview. With reference to FIGS. 1A-1C and 2, a wire-less variable gap width system 100 configured in accordance with an embodiment of the present invention includes a frame 10 that supports a spool 12 and a take up reel 14 between sides 16*a*, 16*b* of the frame. A film 114 that is carried on spool 12 is passed over one roller 104 of a pair of rollers 102, 104, that are supported longitudinally adjacent one another at one end of frame 10 and is collected on take up reel 14. Not shown in the illustrations are motors or other actuators that are connected to take up reel 14 and spool 12, which motors may advance the take up reel 14 and spool 12 to dispense film 114 prior to, during, and/or following the material deposition operations discussed further below. Rollers 102 and 104 may be supported by pins about which they are free to rotate within frame 10. Alternatively, rollers 102 and 104 may be fixed about such pins, with films 112, 114 sliding over the rollers, but the rollers themselves not moving.

Film 112 which is to be coated with a material passes about roller 102, between roller 102 and 104, adjacent film 114 along a lateral dimension of frame 10 at which rollers 102 and 104 are closest together. Coating of the film 112 occurs in the gap 20 between rollers 102 and 104, or more precisely between films 112 and 114, which are disposed about the outer surfaces to the two rollers.

Figure 3:
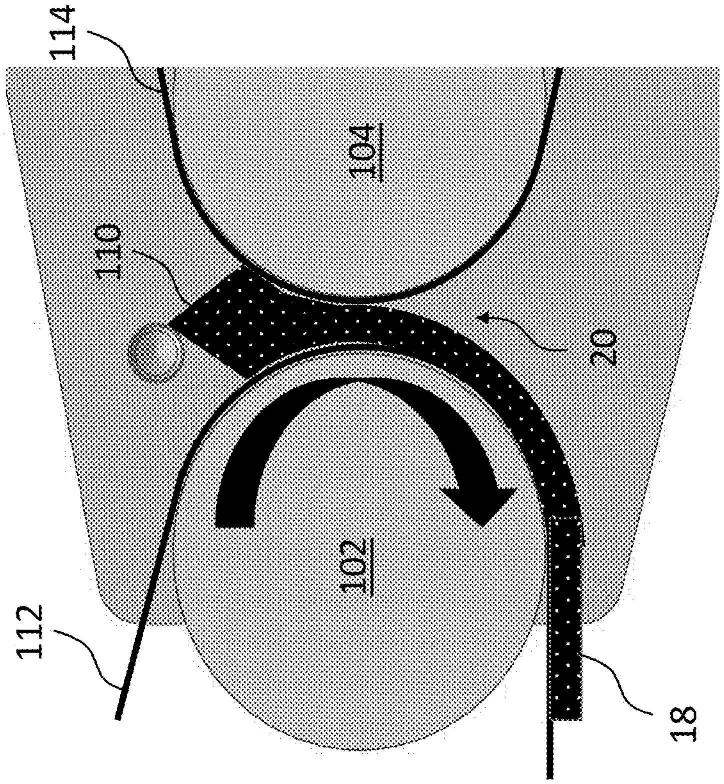
FIG. 3 illustrates a detailed view of a gap area between rollers of the system shown in FIG. 1 during the coating of a material onto a film.

As shown in FIG. 3, the material 110 to be coated on film 112 is deposited at a point above gap 20 (or, more precisely, upstream in a direction of film 112 travel from gap 20) and the motion of film 112 about roller 102 draws a layer 18 of material 110 onto the outer surface of film 112, with the width of gap 20 determining the thickness of the material layer 18. Film 114 can be advanced about roller 104 as film 112 is advanced about roller 102 in order to remove any residual material 110 from the area of gap 20, e.g., residue due to previous coating operations, to recover unused portions of material 110, or for other purposes (e.g., in connection with a change of materials 110). The material 110 to be coated on film 112 may be a viscous material such as a liquid, a paste, or an adhesive, or it may be a low viscosity material such as a polymeric solution. In various embodiments, the material 110 may be changed between two consecutive coating procedures, with the gap 20 being enlarged during the coating of the second material so as not to displace a previously coated material layer on film 112. The various rollers and spools described herein may be made of metal, ceramic, plastic, rubber, or a combination of such materials and may be coated so as to allow the films 112, 114 to pass freely thereover.

In some embodiments, the material 110 may deposited near gap 20 from a syringe or other reservoir in which the material 110 is maintained. Such a syringe or other reservoir may be kept in a controlled environment in which pressure, temperature, and/or other environmental conditions are maintained according to the needs of material 110. From the syringe or reservoir, the material 110 is deposited upstream of gap 20 to be coated on film 112 (or another substrate), which then passes through gap 20 formed by the pair of cylindrical rollers 102, 104. After passing through the gap 20, a uniform layer 18 of the material 110 will be present on film 112 and the coated film can be provided to further stations for deposition/dispensing of the material or for other purposes. In some cases, after the uniform layer 18 of material 110 has been coated, the coated portion of film 112 can be returned to a position upstream of gap 20 (e.g., in a loop or by linear translation) for recoating with a uniform layer of a second material or to fill in any spaces in layer 18 from the first coating. For example, in various embodiments film 112 can be translated bidirectionally in a controlled manner, so that it can be repositioned while opening the gap 20 between rollers 102, 104, allowing for recoating the same area of film 112 with material 110 (or another material) without contamination to the rollers and reducing or eliminating the amount of film 112 consumed during the coating process. Film 112 may be a transparent film or other substrate, with or without a metal (or other) backing.

Examining system 100 in more detail, FIGS. 1A-1C and 2 illustrate arms 106*a*, 106*b* inside of sides 16*a*, 16*b* within frame 10. While two, parallel arms 106*a*, 106*b* are preferred, in some embodiments only a single arm or, alternatively, more than two arms may be present. In the following description, reference is made to a single arm 106 and is associated components, however, it should be appreciated that the same description applies equally to a second arm and/or additional arms and its/their associated components, where present.

Figure 4:
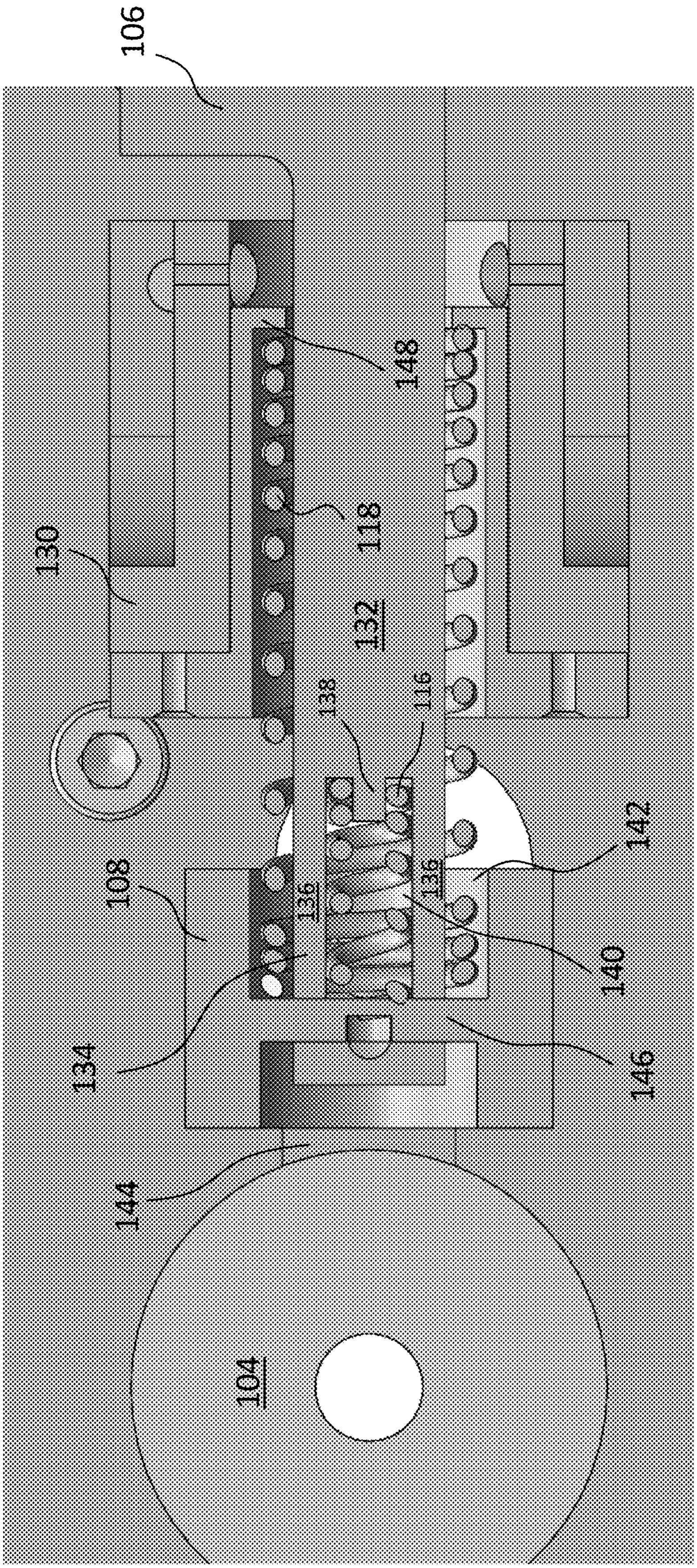
FIG. 4 illustrates a detailed view of an area of the system shown in FIG. 1, showing in particular the connection between an arm and a roller thereof.

Referring to FIG. 4, arm 106 biases (through springs and an associated bearing, as discussed below) roller 104 along its length so as to maintain consistency in width across the lateral dimension of gap 20. At one end of arm 106 is a guide assembly 130 through which a tapered portion 132 of arm 106 passes. Tapered portion 132 of arm 106 terminates in a notched end 134 having two parallel outer edges 136 and an inner spring anchor 138 in the form of a detent that does not extend the entire length of a recess 140 formed by the two parallel outer edges 136 in the notched end 134.

An H-shaped bracket 108 receives the notched end 134 of arm 106 within recess 142 formed in one side of the bracket. The opposite side of bracket 108 abuts a bearing 144 which acts as an interface between bracket 108 and roller 104. Bearing 108 may be made of metal, ceramic, plastic, rubber, or a combination of such materials and may be coated so as to allow roller 104 to turn freely about its axis.

A spring 118 is helically coiled about an outer perimeter of tapered portion 132 of arm 106 within recess 142 and guide assembly 130 and is compressed between a detent 148 of guide assembly 130 and a cross member 146 of H-shaped bracket 108. As arm 106 moves (under the control of a linear actuator, as described below), the position of the H-shaped bracket 108, and, accordingly, roller 104 changes, thus varying the width of gap 20 between roller 104 and roller 102. A second spring 116 is located within recess 140 in the notched end 134 of arm 106 and is helically coiled about inner spring anchor 138. Spring 116 biases arm 106 against H-shaped bracket 108 and, in turn, roller 104, and is compressed between an inner surface of recess 140 in notched end 134 and cross member 146 of H-shaped bracket 108. Spring 116 thus forces arm 106 away from roller 104 to avoid backlash when the linear actuator begins to move arm 106. Springs 116 and 118 have counterparts for the arm on the opposite side of frame 10.

Returning to FIGS. 1A-1C and 2, linear actuators 124*a*, 124*b* (one per arm 106*a*, 106*b*) are arranged to move respective arms 106*a*, 106*b* longitudinally within frame 10. Moving arms 106*a*, 106*b* in this fashion will translate roller 104 within frame 10, thereby adjusting the width of gap 20 between rollers 102, 104. Operation of the linear actuators 124*a*, 124*b* is achieved, in one embodiment, using a processor-based controller (not shown). One example of a processor-based controller upon or with which the methods of the present invention may be practiced will typically include a processor communicably coupled to a bus or other communication mechanism for communicating information; a main memory, such as a RAM or other dynamic storage device, coupled to the bus for storing information and instructions to be executed by the processor and for storing temporary variables or other intermediate information during execution of instructions to be executed by the processor; and a ROM or other static storage device coupled to the bus for storing static information and instructions for the processor. A storage device, such as a hard disk or solid-state drive, may also be included and coupled to the bus for storing information and instructions. The subject controller may, in some instances, include a display coupled to the bus for displaying information to a user. In such instances, an input device, including alphanumeric and/or other keys, may also be coupled to the bus for communicating information and command selections to the processor. Other types of user input devices, such as cursor control devices may also be included and coupled to the bus for communicating direction information and command selections to the processor and for controlling cursor movement on the display. The controller may also include a communication interface coupled to the processor, which provides for two-way, wired and/or wireless data communication to/from the controller, for example, via a local area network (LAN). The communication interface sends and receives electrical, electromagnetic, or optical signals which carry digital data streams representing various types of information. For example, the controller may be networked with a remote unit (not shown) to provide data communication to a host computer or other equipment operated by a user. The controller can thus exchange messages and data with the remote unit, including diagnostic information to assist in troubleshooting errors, if needed.

Such a controller may be programmed to operate linear actuators 124*a*, 124*b* to move the arms 106*a*, 106*b* to achieve a desired gap width 20 for coating a film 114 with a film 18 of material 110 of desired thickness. The controller also may be programmed to advance film 112 and/or film 114 as needed for such a coating process. To achieve the desired level of precision in gap width 20, the linear actuators 124*a*, 124*b* may employ piezo translators that include a piezo ceramic that expands in a defined direction upon application of an electric current (e.g., under the control of the controller). The ceramic may be orientated so that when it expands (at the application of a current under the control of the controller), the arm connected to the actuator is displaced along a single axis (e.g., the longitudinal dimension), along the direction of the expansion of the crystal. Generally, a number of piezo translators may be used per actuator and the various piezo translators may be energized at the same time (or nearly so) so that their actions are coordinated with one another. Thus, the piezo translators may be arranged so that they impart longitudinal motion to the arms in the same direction and the translation distance may be proportional to the magnitude of the current applied to the piezo translators. The piezo translator(s) employed in embodiments of the present invention may be any of: longitudinal piezo actuators, in which an electric field in the ceramic is applied parallel to the direction of its polarization; piezoelectric shear actuators, in which the electric field in the ceramic is applied orthogonally to the direction of its polarization; or tube actuators, which are radially polarized and have electrodes are applied to an outer surfaces of the ceramic so that the field parallel to its polarization also runs in a radial direction. Alternatively, the linear actuators 124*a*, 124*b* may employ lead screws that are advanced or retracted according to control signals from the controller to move arms 106*a*, 106*b* in the longitudinal dimension. Or the linear actuators 124*a*, 124*b* may employ worm drives that are activated according to control signals from the controller to move arms 106*a*, 106*b* in the longitudinal dimension. The use of the term “actuator” herein is intended to encompass various alternative means for displacing the arms in the longitudinal dimension.

As mentioned, springs 118 act to bias roller 104 towards roller 102, thereby maintaining a constant gap width across the longitudinal dimension of the rollers. Respective springs 116 act to bias the arms 106*a*, 106*b* away from the roller 104 to avoid backlash when the associated linear actuator 124*a*, 124*b* begins to pull roller 104 away from roller 102, widening gap 20. A linear encoder 120 is mounted on the frame 10 to measure the position of each respective arm 106*a*, 106*b*. When the linear actuators 124*a*, 124*b* move roller 104, a "zero" position of the system may be set as the position at which such motion is first detected by the linear encoder 120. The width of the gap 20 is then determined by the amount of motion the linear encoder 120 measures after this point. System 100 is also equipped with two optical, or other, limit switches 122*a*, 122*b*. The limit switches 122*a*, 122*b* serve to identify when each respective arm 106*a*, 106*b* has reached its home position. The home position may define a minimum, maximum, or other gap width between rollers 102, 104.

As indicated above, coating of a layer 18 of material 110 onto film 112 occurs in the gap 20 between rollers 102 and 104. The width of this gap 20 determines the thickness of the material layer 18 and is set by positioning roller 104 a desired distance from roller 102 using linear actuators 124*a*, 124*b*. Linear actuators 124*a*, 124*b* adjust the position of arms 106*a*, 106*b*, which in turn set the position of roller 104 (e.g., with respect to roller 102) through the biasing of respective springs 118, one per arm and parallel to one another. With an amount of material 110 deposited upstream of and near gap 20, film 112 is passed over roller 102 and film 114 is passed over roller 104 opposite film 112 (e.g., to remove any material residue from a previous coating, to recover unused material 110 or for other purposes). As film 112 is advanced through gap 20 between the rollers 102, 104, the material 110 forms a layer 18 with thickness equal to the gap width on film 112.

Figure 5A:
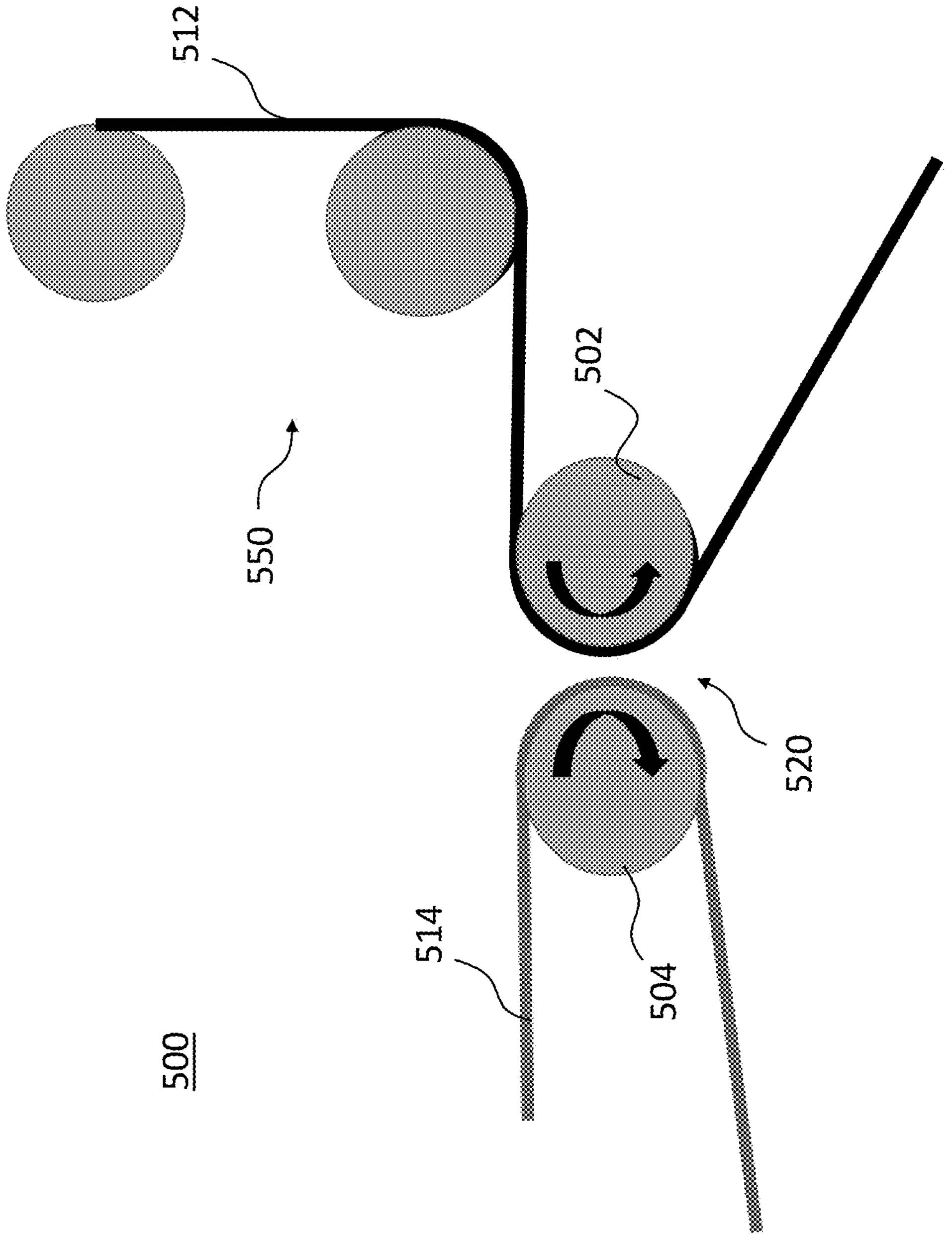
FIGS. 5A-5C illustrate the use of a well-defined gap of a wire-less variable gap width system configured in accordance with an embodiment of the present invention for mixing of multiple materials when coating a film or other substrate.
Figure 5B:
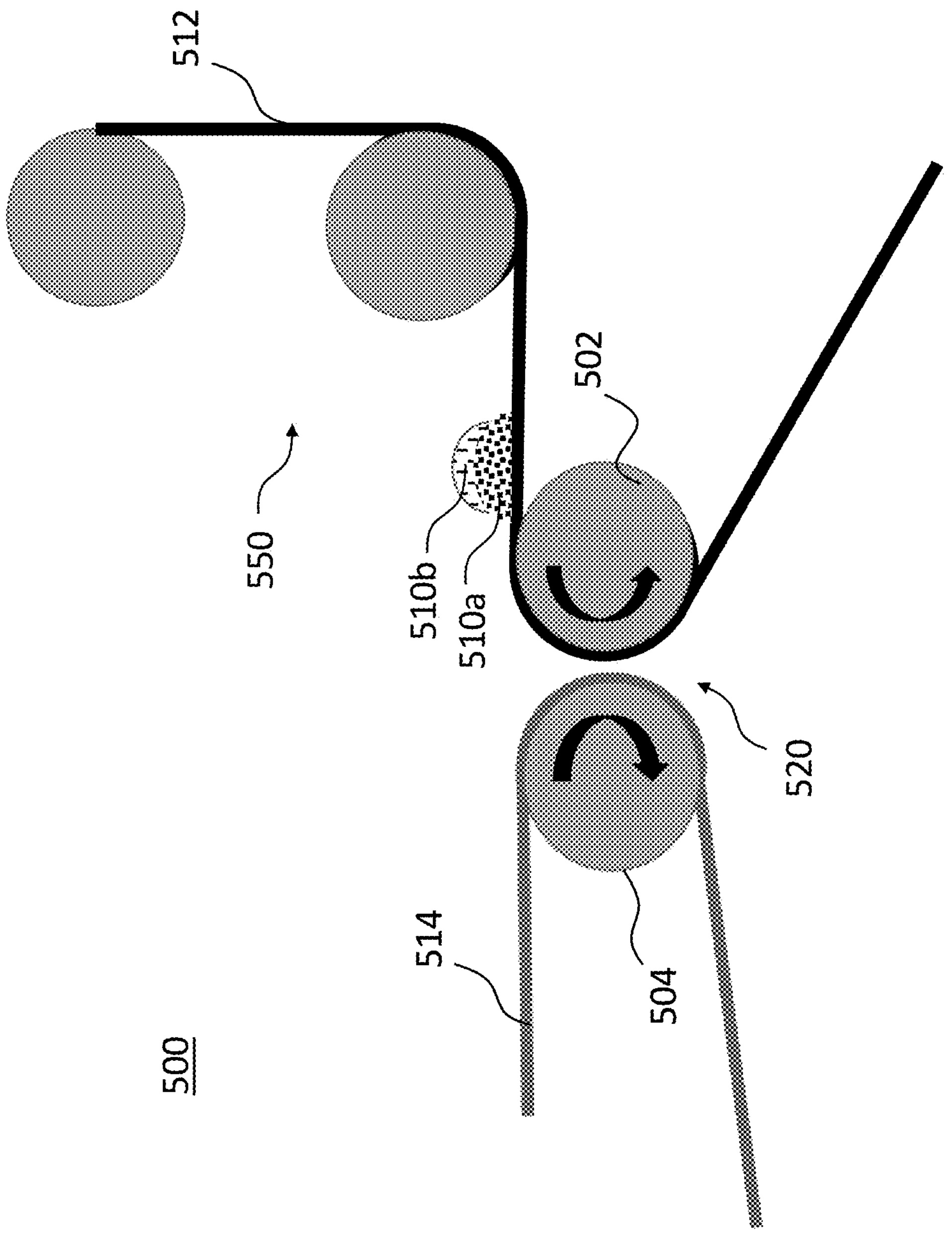
Figure 5C:
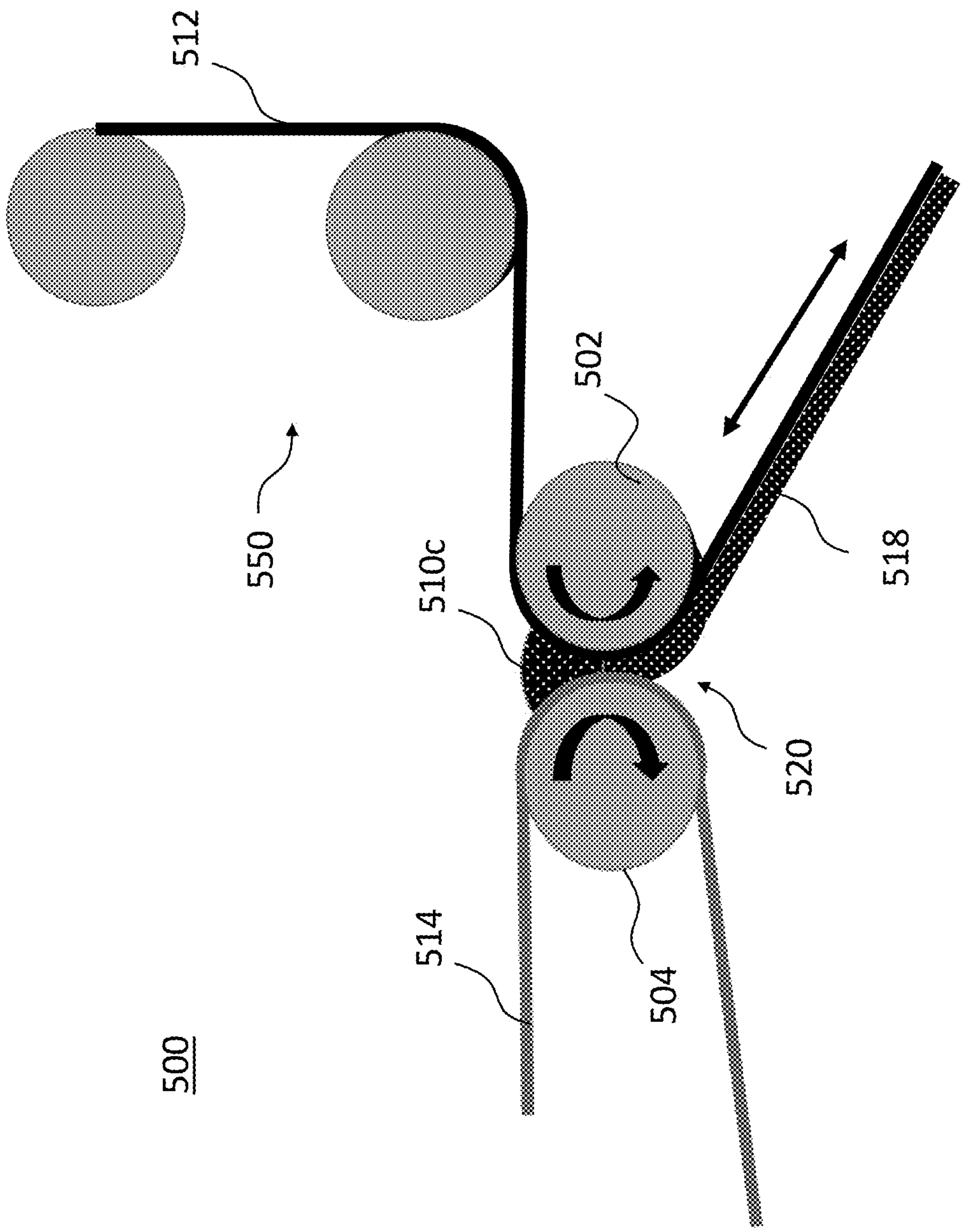
Figure 6A:
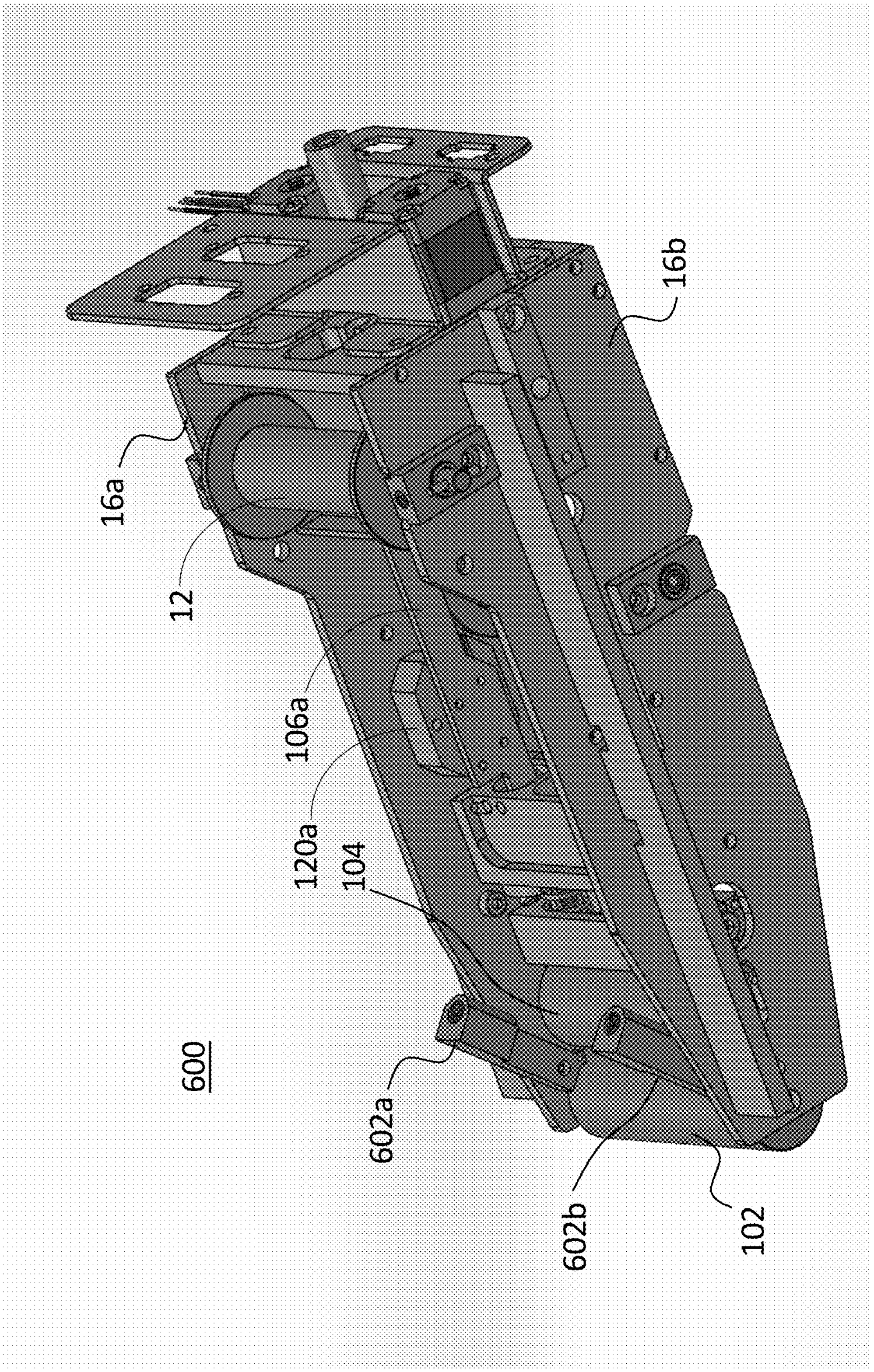
FIGS. 6A-6D illustrate a further embodiment of a wire-less variable gap width system configured in accordance with the present invention in which air knives for removal of material are included.
Figure 6B:
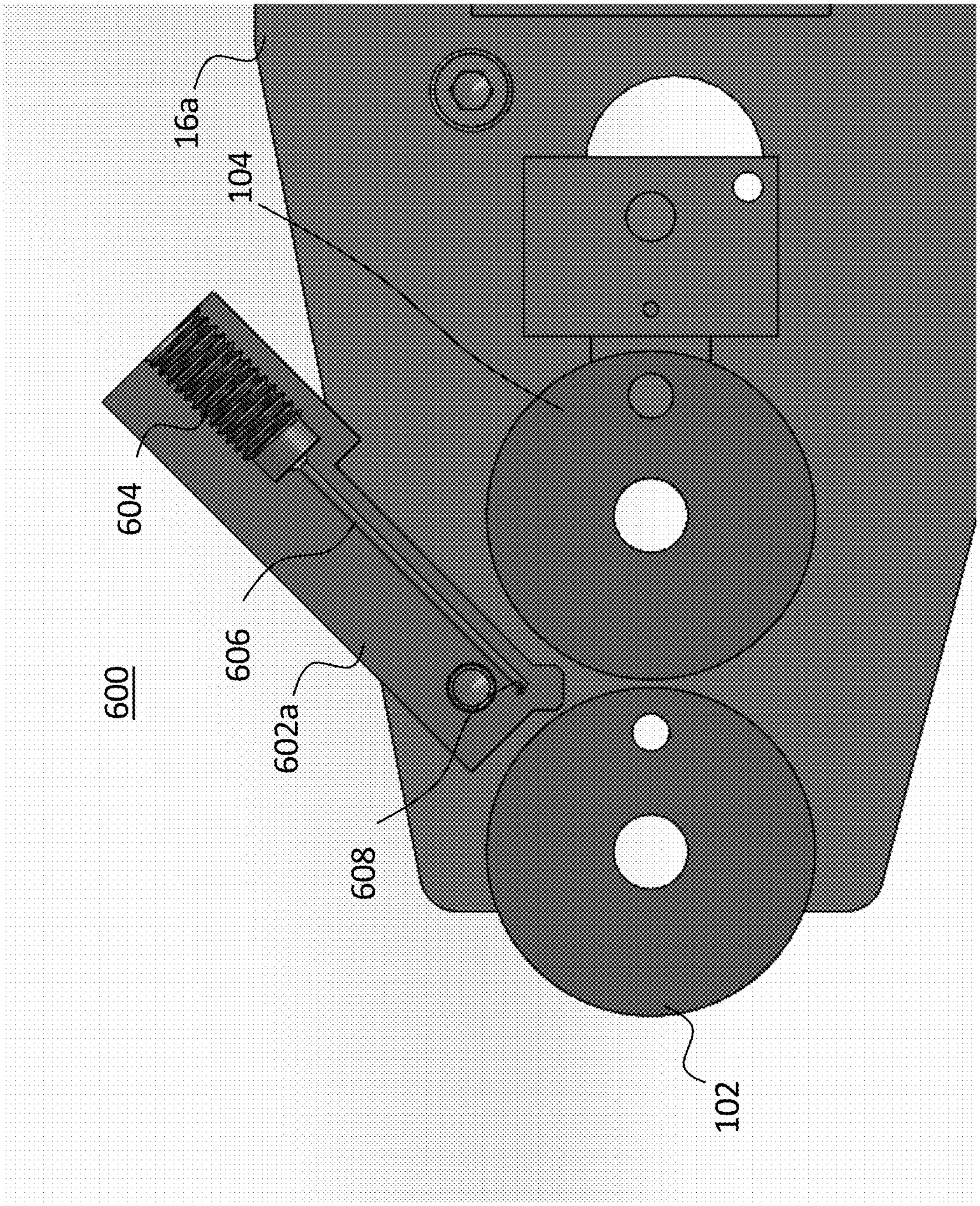
Figure 6C:
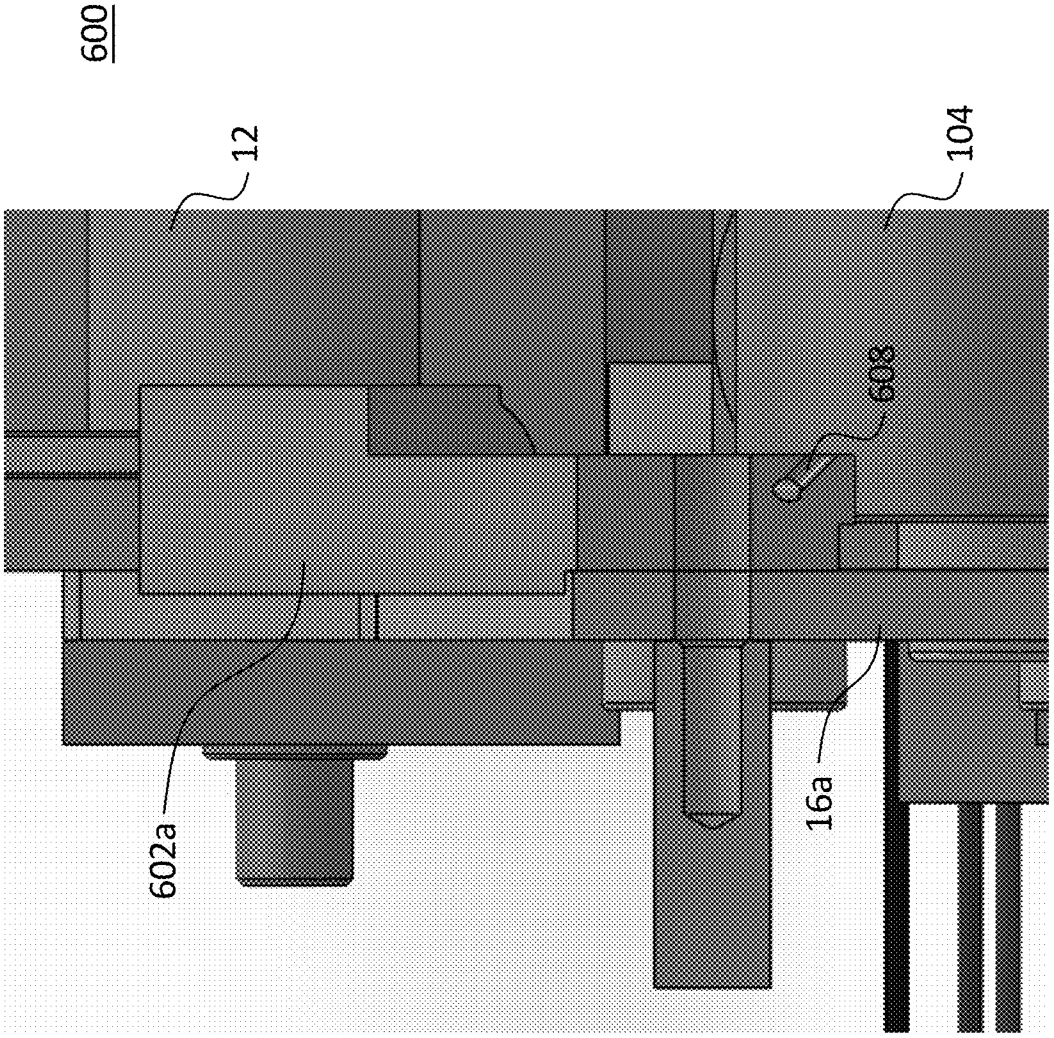
Figure 6D:
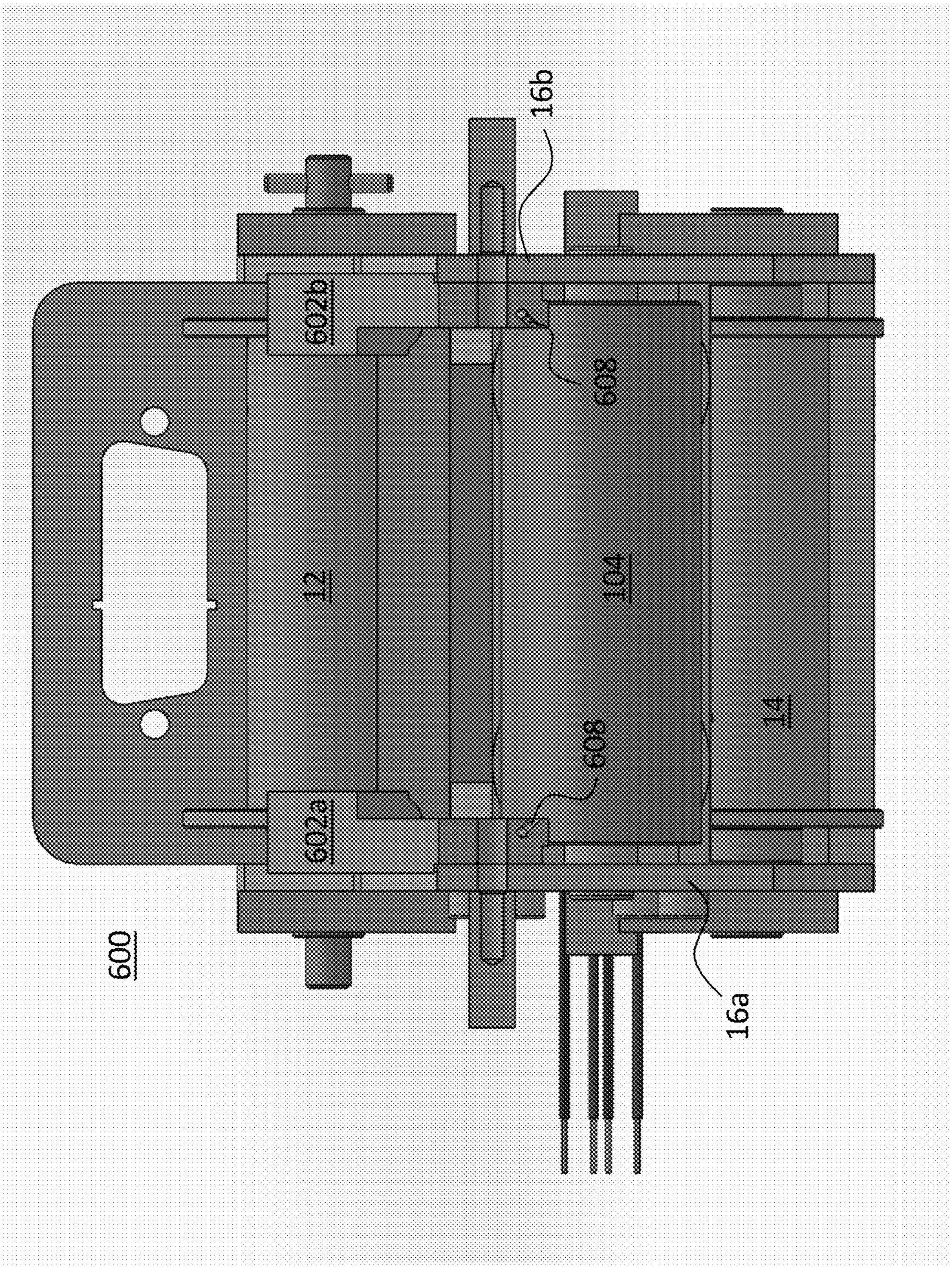

In some embodiments, the layer of material that is coated onto the film 112 may be a mixture of two or more separate materials. FIGS. 5A-5C illustrate one use of a well-defined gap 520 between rollers 502, 504 of a wire-less variable gap width system 500 configured in accordance with an embodiment of the present invention for such mixing of multiple materials 510*a*, 510*b* when coating a film 512 or other substrate. The ability to use a gap in such a system for mixing two or more materials just before printing may be of particular importance when the various materials react with one another and dispensing them together on a film from a common dispenser (e.g., a syringe) may end up obstructing or otherwise impairing the operation of the dispenser. By using the gap as a point of mixing, each material is distributed onto the film from its own dispenser and the reaction between the materials (if any) takes place only on the film just before printing. Indeed, such a technique may be employed in other gap-based coating systems that do not utilize other aspects of the above-described wire-less variable gap width system, hence, the provision of a gap-based mixing arrangement should not be construed as being limited to such systems.

As shown in FIG. 5A, system 500 contains two films 512, 514 that each roll over a respective one of a pair of rollers 502, 504 to create a known gap 520 between them. The films and rollers of the system may be made of any of the materials for such items described herein. Film 512 on which a layer of material will be coated is dispensed by an arrangement 550 which, in this example, has a pair of feeder rollers, but this is only for illustration and the details of the dispensing arrangement are not critical to the present invention.

As illustrated in FIG. 5B, upstream (from the point of view of the direction of travel of film 512) of gap 520, amounts of materials 510*a* and 510*b* are dispensed onto film 512. The materials 510*a* and 510*b* to be coated on film 112 may be dispensed separately, e.g., to avoid reactions between the materials within a common dispenser, and, referring to FIG. 5C, the motion of film 512 about roller 502 draws the two materials together into a single mixture 510*c* which then forms a layer 518 on the outer surface of film 512, with the width of gap 520 determining the thickness of the layer 518. Film 514 can be advanced about roller 504 as film 512 is advanced about roller 502 in order to remove any residual amounts of the mixture 510*c* from the area of gap 520, e.g., to prevent blockage of the gap. The materials 510*a*, 510*b* used to form the mixture 510*c* may be any of those discussed above and one or more of the materials may be replenished and/or changed between consecutive coating procedures, with the gap 520 being enlarged during such second coatings so as not to displace a previously coated material layer 518 on film 512.

Further, while maintaining a fixed gap width, the direction of travel of the coated film may be controlled so that the coated film is drawn back through gap 520 with the layer 518 thereon and then passed through gap 520 in the original direction so as to ensure a thorough mixing of the materials that make up layer 518. Such a process may be repeated multiple times to obtain an optimum level of such mixing and to help ensure a uniform layer thickness on film 512. Alternatively, such bidirectional translation of the film 512 through gap 520 may be undertaken while reducing the width of gap 520, e.g., using biased arms controlled by linear actuators to position roller 504 relative to roller 502 as discussed above, so as to produce a layer 518 of a desired thickness.

This ability to mix materials in a gap, and to ensure a robust and reproducible printing process that provides a high-quality layer of material coated on a film or other substrate, is a direct consequence of the method used for the printing process. Other printing techniques, such as inkjet or screen printing, cannot provide such assurances. Further, the present process also ensures that materials such as two components of an epoxy paste will not react with one another in a dispenser prior to printing, thereby prolonging the pot lives of the component materials. Mixing components at a gap, as in the present system, is less prone to clogging than other techniques because the gap can be refreshed simply by moving the non-coated film through the gap to remove any contaminants.

Referring now to FIGS. 6A-6D, 7, and 8 a further embodiment of a wire-less variable gap width system 600 configured in accordance with yet another embodiment of the present invention is illustrated. In these illustrations, components that are the same as those discussed above with respect to wire-less variable gap width system 100 are given similar reference numerals and will not be described further, except in connection with the air knives 602*a*, 602*b* included in wire-less variable gap width system 600 for removal of material. As mentioned above, when coating a film 112, it is possible that the gap 20 will become contaminated by unused material 110. Some of the contaminants can be removed using a second film 114, and with relatively viscous materials that technique works well. However, when deposited upstream of a gap 20, low viscosity materials may tend to flow freely, especially as film 112 draws such materials to and through gap 20, and so to stop the low viscosity material from over-running the film, e.g., in a direction orthogonal to the direction of travel of the film while passing through the gap, air knives 602*a*, 602*b* may be used. That is, air propelled by air knives 602*a*, 602*b* may act as a physical impediment to the flowing of the low viscosity material outside the bounds of the film 112, where the material may contaminate the rollers 102, 104, e.g., on their sides opposite gap 20.

Figure 7:
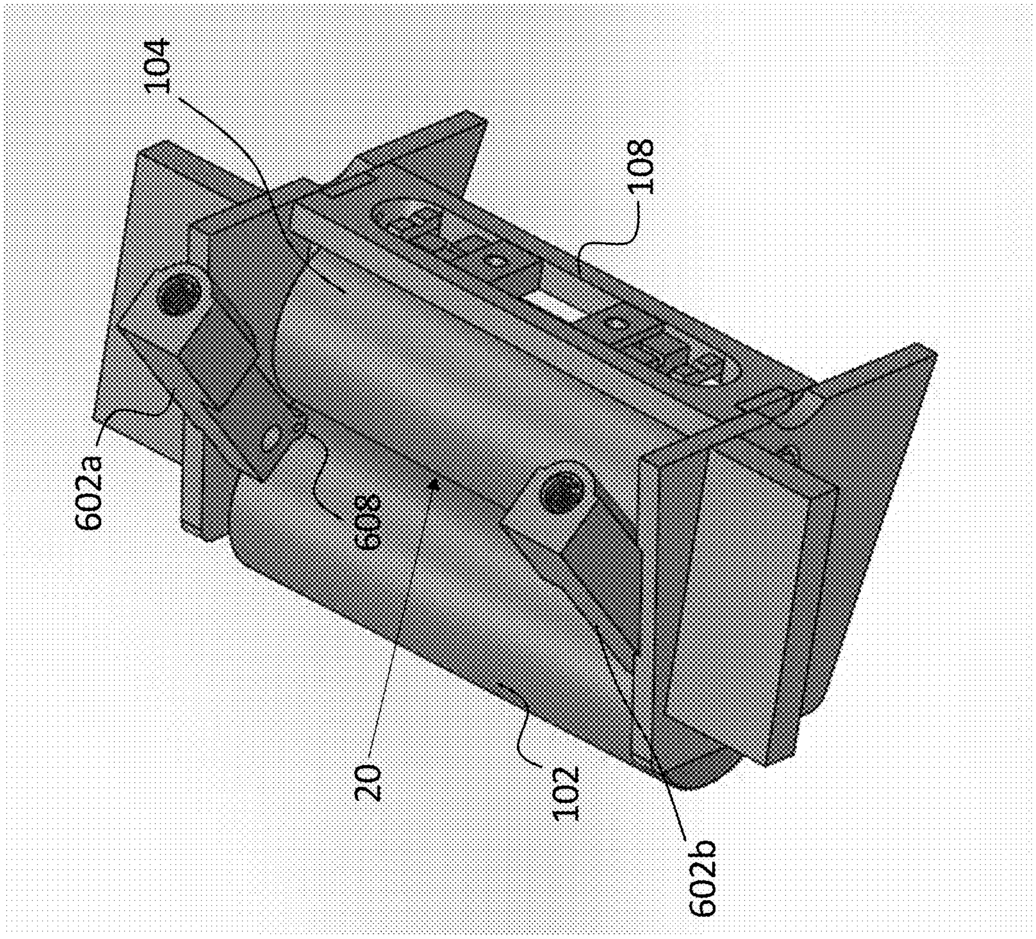
FIG. 7 further illustrates the provision of air knives near a gap between rollers of a wire-less variable gap width system configured in accordance with an embodiment of the present invention.
Figure 8:
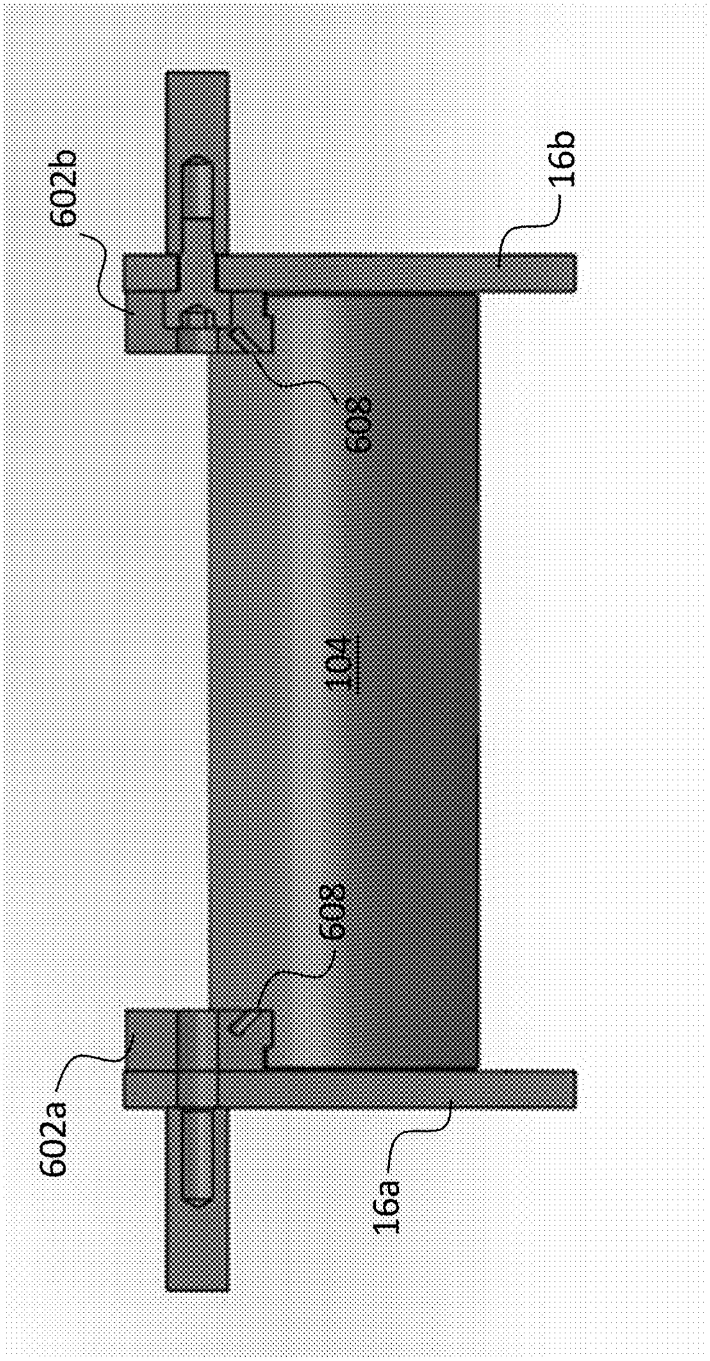
FIG. 8 illustrates a cut-away view of a pair of air knives near a gap between rollers of a wire-less variable gap width system configured in accordance with an embodiment of the present invention.

FIG. 7 further illustrates the provision of air knives 602*a*, 602*b* near a gap 20 between rollers 102, 104 of a wire-less variable gap width system configured in accordance with an embodiment of the present invention, and FIG. 8 illustrates a cut-away view of a pair of air knives 602*a*, 602*b* near such a gap 20. Each air knife 602*a*, 602*b* creates an air flow at an angle of 0-180 degrees from a respective side of the propagating material film 112, and preferably at an angle of 70-110 degrees from such side. That is, the angle of the air flow may be directed from 0 to 180 degrees from a respective side of the film, either by rotating the air knife with respect to frame 10 and/or by design of the air flow channel within the air knife, but it has become apparent that an angle of 70-90 degrees will be most effective in preventing the free flow of low viscosity materials.

Air knives 602*a*, 602*b* each include a threaded coupling 604 to which an air hose may be attached. For example, threaded coupling 604 may be a check valve to allow airflow only in one direction. In some embodiments, threaded coupling 604 may be a Schrader valve or a Presta valve, either of which may have an associated valve stem 606 to direct air from an air hose or other air supply means to an outlet 608 that is directed towards the area where the edge of the film 112 will pass near gap 20. The air knives may be used in conjunction with any of the embodiments described herein.

Thus, the present invention provides, in various embodiments, systems and methods that enable coating of a thin film with a viscous or other material at a desired thickness at low cost and in a high quality.

What is claimed is:

1. A method, comprising:

coating a first film with a layer of a material;

moving the first film and a second film adjacent one another over respective rollers across a gap between the respective rollers, the gap defining a thickness of the layer of the material on the first film, such that an amount of the material deposited upstream in terms of a direction of movement of the first and second films from the gap is drawn through the gap;

positioning a first one of the respective rollers opposite to a second one of the respective rollers by biasing a bearing supporting the first one of the respective rollers by a first pair of parallel springs; and widening the gap between the respective rollers by moving the first one of the respective rollers with respect to the second one of the respective rollers using a pair of linear actuators coupled to translate respective arms which support the first pair of parallel springs, wherein the first film passes over the first one of the respective rollers and the second film passes over the second one of the respective rollers opposite the first film.

2. The method of claim 1, wherein the second film is advanced along with the first film to remove any residue from a previous coating or to recover unused amounts of the material.

3. The method of claim 1, further comprising biasing the respective arms away from the first one of the respective rollers by a second pair of springs to avoid backlash when the pair of linear actuators translates the respective arms.

4. The method of claim 1, further comprising measuring respective positions of the respective arms during movement of the respective arms using linear encoders.

5. The method of claim 4, further comprising defining a zero position as a position at which motion is first detected by the linear encoders when the pair of linear actuators moves the respective arms.

6. The method of claim 4, further comprising using a limit switch to identify when the respective arms have reached a home position.

* * * * *